United States Patent
Han et al.

(10) Patent No.: US 8,514,940 B2
(45) Date of Patent: Aug. 20, 2013

(54) METHOD AND SYSTEM FOR CARRYING OUT RELIABILITY CLASSIFICATION FOR MOTION VECTORS IN A VIDEO

(75) Inventors: Bo Han, Beijing (CN); Weiguo Wu, Beijing (CN)

(73) Assignee: Sony Corporation, Tokyo (JP)

( * ) Notice: Subject to any disclaimer, the term of this patent is extended or adjusted under 35 U.S.C. 154(b) by 344 days.

(21) Appl. No.: 12/715,707

(22) Filed: Mar. 2, 2010

(65) Prior Publication Data

US 2010/0231802 A1 Sep. 16, 2010

(30) Foreign Application Priority Data

Mar. 12, 2009 (CN) .......................... 2009 1 0119521

(51) Int. Cl.
*H04N 7/12* (2006.01)
*H04N 11/02* (2006.01)
*H04N 11/04* (2006.01)

(52) U.S. Cl.
USPC ................................. 375/240.16; 375/240.24

(58) Field of Classification Search
None
See application file for complete search history.

(56) References Cited

U.S. PATENT DOCUMENTS

| | | | | |
|---|---|---|---|---|
| 5,835,147 | A * | 11/1998 | Florentin et al. | 375/240.12 |
| 6,185,340 | B1 * | 2/2001 | Comer | 382/236 |
| 6,842,483 | B1 * | 1/2005 | Au et al. | 375/240.16 |
| 2007/0074251 | A1 * | 3/2007 | Oguz et al. | 725/45 |
| 2008/0101678 | A1 * | 5/2008 | Suliga et al. | 382/132 |
| 2008/0304735 | A1 * | 12/2008 | Yang et al. | 382/164 |

OTHER PUBLICATIONS

Toshiyuki Yoshida et al., "Reliability metric of motion vectors and its application to motion estimation", SPIE, vol. 2501, pp. 799-809.
Bo Han et al., "Enhanced Sports Video Shot Boundary Detection Based on Middle Level Features and a Unified Model", IEEE Transactions on Consumer Electronics, vol. 53, No. 3, Aug. 2007, pp. 1168-1176.
Yichuan Hu et al.,"Enhanced Shot Change Detection Using Motion Features for Soccer Video Analysis", ICME, 2007, pp. 1555-1558.
Seungjoon Yang et al., "Pattern Matching Assited Motion Estimation and Motion Vector Histogram Analysis for Interlaced-To-Progressive Conversion", IEEE International Conference on Image Processing. 2002, pp. III-365-III-368.
Toshiyuki Yoshida et al.. "Block Matching Motion Estimation Using Block Integration Based on Reliability Metric", IEEE 1997, pp. 152-155.
Hisao Sasai et al., "Frame-Rate Up-Conversion Using Reliable Analysis of Transmitted Motion Information", ICASSP 2004, pp. V-257-V-260.

(Continued)

*Primary Examiner* — Nhon Diep
*Assistant Examiner* — Kevin McInnish
(74) *Attorney, Agent, or Firm* — Oblon, Spivak, McClelland, Maier & Neustadt, L.L.P.

(57) ABSTRACT

A method and system for carrying out reliability classification for motion vectors in a video is proposed in the application. The method comprises: partitioning and searching step for partitioning a specified video frame of an input video, and searching motion vectors for a specified block of the specified video frame so as to generate a block matching error for the specified block; texture feature extracting step for extracting a texture feature of the specified block; and classifying-by-block step for carrying out reliability classification for the motion vectors for the specified block in accordance with the block matching error and the texture feature of the specified block.

19 Claims, 6 Drawing Sheets

(56) References Cited

OTHER PUBLICATIONS

F. Colace et al., "Noisy Motion Vectors Removal for Reliable Camera Parameters Estimation in MPEG Coded Videos", IEEE 2003, pp. 568-572.

R. Venkatesh Babu et al., "Compressed Domain Motion Segmentation for Video Object Extraction", IEEE 2002, pp. IV-3788-IV-3791.

I. Patras et al., "Confidence Measures for Block Matching Motion Estimation", IEEE ICIP, 2002, pp. II-277-II-280.

Demin Wang et al., "Hybrid De-Interlacing Algorithm Based on Motion Vector Reliability", IEEE Transaction on Circuits and Systems for Video Technology, vol. 15, No. 8, Aug. 2005, pp. 1019-1025.

Joerg Heuer et al., "Global Motion Estimation in Image Sequences Using Robust Motion Vector Field Segmentation", ACM Intl. Multimedia Conf., 1999, pp. 261-264.

* cited by examiner

Reference frame and motion searching result of the corresponding blocks

*Fig. 7A*

Current frame and partitioning result of its center region

METHOD AND SYSTEM FOR CARRYING OUT RELIABILITY CLASSIFICATION FOR MOTION VECTORS IN A VIDEO

TECHNICAL FIELD

The present application relates to processing/analysis on a video (a moving image). Particularly, the present application relates to a system and method for carrying out reliability classification for motion vectors in a video, which is used to classify motion information (motion vector in the present application) extracted from the video in accordance with the reliability thereof.

BACKGROUND ART

Motion information of a certain image region extracted from video data is an important feature commonly used in the processing/analysis on the video. It is expected that this kind of information can reflect a motion of a target in the video accurately. However, a collection of a number of pixel points in the video is not necessarily unique spatially and constant temporally. Therefore, only part of the motion information obtained by an existing method are reliable and can reflect the real motion of the video target while those unreliable motion information will bring out adverse influence on the processing/analysis on the video. The so-called reliable means that the motion depicts accurately a change in positions, between different frames in the video, of the physical target corresponding to the region (or the corresponding imaginary physical target in a cartoon).

In the existing effective methods for searching motion vectors (taking the full search with a search range large enough as an example), searching results are mainly classified into two cases, reliable and unreliable. The existing technologies that carry out reliability evaluation on the motion vectors in the video mainly use three kinds of information: a texture feature of an image region, an error feature of matching the image regions, and correlation information between different regions. However, the existing various technologies still have deficiencies in the application.

SUMMARY OF THE INVENTION

To make up the deficiencies in the application of the existing technologies and attain an object of recognizing the unreliable motion vector or extracting the corresponding reliable motion vector, a new and more effective method for reliability classification for motion vectors is provided in the present application.

In one embodiment to realize the invention, a method for carrying out reliability classification for motion vectors in a video is provided, comprising: partitioning and searching step for partitioning a specified video frame of an input video, and searching motion vectors for a specified block of the specified video frame so as to generate a block matching error for the specified block; texture feature extracting step for extracting a texture feature of the specified block; and classifying-by-block step for carrying out reliability classification for the motion vectors for the specified block in accordance with the block matching error and the texture feature of the specified block.

In another embodiment to realize the invention, a system for carrying out reliability classification for motion vectors in a video is provided, comprising: a partitioning and searching module for partitioning a specified video frame of an input video, and searching motion vectors for a specified block of the specified video frame so as to generate a block matching error for the specified block; a texture feature extracting module for extracting a texture feature of the specified block; and a classifying-by-block module for carrying out reliability classification for the motion vectors for the specified block in accordance with the block matching error and the texture feature of the specified block.

In another embodiment to realize the invention, a method for carrying out reliability classification for motion vectors in a video is provided, comprising: classifying-by-block step for carrying out reliability classification for the motion vectors for blocks obtained by partitioning a specified video frame of an input video; and classifying-by-frame step for optimizing the reliability classification for the motion vectors within the specified video frame in accordance with the reliability classification for the motion vectors of the blocks in the specified video frame, so as to obtain the optimized classification for the motion vectors of the blocks in the specified video frame.

In another embodiment to realize the invention, a system for carrying out reliability classification for motion vectors in a video is provided, comprising: a classifying-by-block module for carrying out reliability classification for the motion vectors for blocks obtained by partitioning a specified video frame of an input video; and a classifying-by-frame module for optimizing the reliability classification for the motion vectors within the specified video frame in accordance with the reliability classification for the motion vectors of the blocks in the specified video frame, so as to obtain the optimized classification for the motion vectors of the blocks in the specified video frame.

In one embodiment of the invention, the unreliable motion vectors are classified into two classes of mismatched and multi-matched according to a reason why the motion vectors are unreliable; the mismatched and multi-matched motion vectors introduced by this classification method enhances the performance of the system in some applications (e.g. the detection of video shot transition).

In another embodiment of the invention, the correlation of the motion vectors between the adjacent regions in the video image is utilized, thereby increasing the correctness of the reliability classification for motion vectors in the video.

In another embodiment of the invention, the reliability classification results for motion vectors in a whole frame is optimized by utilizing statistical methods, which obtains the global optimized result of the whole frame, thereby increasing the correctness of the reliability classification for motion vectors in the video.

In another embodiment of the invention, the image block matching error and the image block internal texture intensity are combined and improved as basic features, and a global optimized result of the classification for motion vectors is obtained by utilizing the correlations of the motion vectors between the adjacent blocks in the image. It enables the result of the classification for motion vectors a considerably high correctness to be reached. For example, as to the mismatched motion vector, the Recall (i.e. a ratio of the number of the motion vectors searched out to meet the condition by the invention to the real number of the motion vectors meeting the condition) and the Precision (i.e. a ratio of the consistency between the reliability classification for motion vectors obtained by the invention and the real reliability classification for motion vectors, for the motion vectors searched out to meet the condition by the invention) of the embodiment can both achieve more than 97%, and as to the reliable motion vector and the multi-matched motion vector, the Recall and the Precision can both exceed or approach 90%. Naturally, the results of the reliability classification with a higher correctness will further enhance the performance of the system in some applications (e.g. global motion estimation on video).

BRIEF DESCRIPTION OF THE DRAWINGS

FIGS. 4(A) and (B) are two examples of differential operators used in step 301 in FIG. 3 (A and B), wherein A is a 2×2 operator (horizontally and vertically), and B is a 3×3 operator (horizontally and vertically).

DETAILED DESCRIPTION OF THE INVENTION

The realization of a method and system in accordance with a specific embodiment of the invention will be described below with reference to the drawings.

As to the existing effective methods for searching motion vector (taking the full search with a searching range large enough as an example), there are mainly two kinds of the cases that the searching results are unreliable. One is mismatched, that is, a target corresponding to a current image region does not exist or varies (in terms of color, texture, shape, size, etc.) largely in a reference frame; the other one is multi-matched, that is, multiple regions that are not overlap entirely with each other in the reference frame are very close to the current image region respectively, thereby causing the searched region and the current image region not corresponding to the same physical target.

Figure 7A:
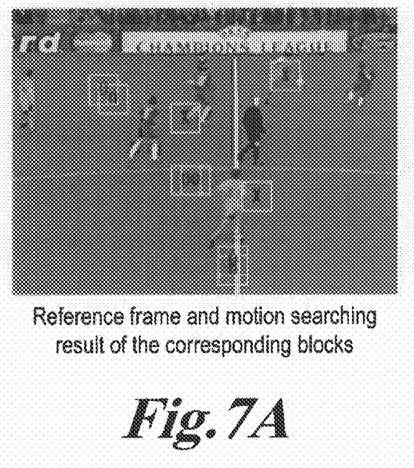
FIGS. 7A and 7B show examples of unreliable motion vectors.
Figure 7B:
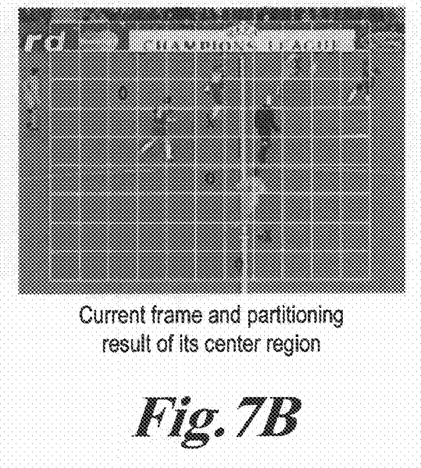

FIG. 7 is an example of unreliable motion vectors, wherein B illustrates the block partition result of the current frame and its center region, and A illustrates the status of motion search for the reference frame and corresponding blocks; wherein the motion vector corresponding to the block denoted by X is mismatched, and the motion vector corresponding to the block denoted by O is multi-matched.

Figure 1:
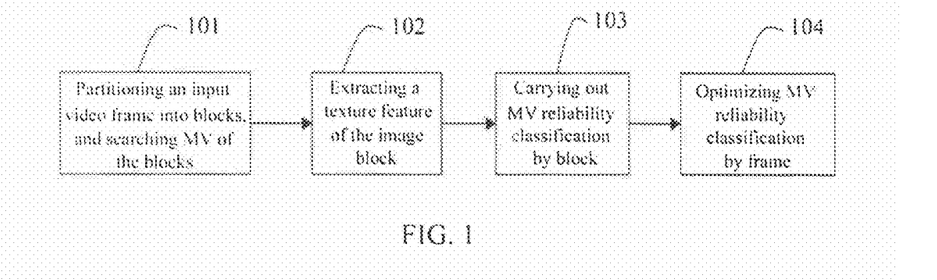
FIG. 1 illustrates a flowchart of a method in accordance with one embodiment of the invention.

FIG. 1 illustrates a flowchart of a method in accordance with one embodiment of the invention. As illustrated in FIG. 1, at step 101 (partitioning and searching step), a specified video frame (i.e. a current video frame) of an input video is partitioned, and motion vectors (MV) of blocks are searched and block matching errors are generated. At step 102 (texture feature extracting step), a texture feature of the specified block (i.e. the current block) of the specified video frame is extracted. At step 103 (classifying-by-block step), the reliability classification for MV is carried out by blocks, that is, in accordance with the block matching error and the texture feature of the specified block, said motion vector is classified into three classes of reliable, mismatched and multi-matched. Obviously, the reliability classification for MV of every block of the current video frame can completed by repeating the steps 102 and 103. At step 104 (classifying-by-frame step), MV classification is optimized by frame, that is, the reliability classification for the motion vectors is optimized within the specified video frame, in accordance with the reliability classification for the motion vectors of the blocks in the specified video frame, so as to obtain an optimized classification for the motion vectors of the blocks in the specified video frame.

Figure 2:
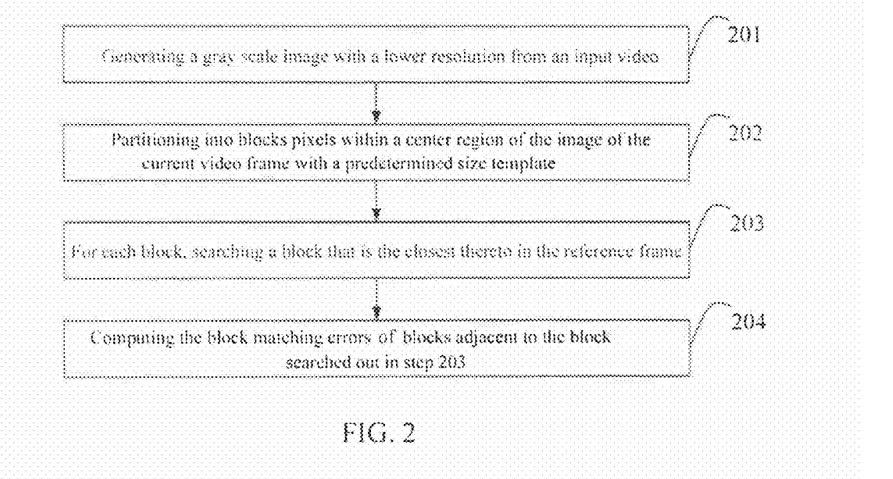
FIG. 2 is a detailed flowchart of step 101 in FIG. 1.

FIG. 2 is a detailed flowchart of step 101 in FIG. 1. As illustrated in FIG. 2, at step 201, a gray scale image with a lower resolution (e.g. 352×288 or 352×240) is generated from the above input video. The purpose of choosing a lower resolution herein is to make the number of the pixels contained in the image region that can reflect relatively obvious motion in one frame image not too large, which can increase computation efficiency. At step 202, pixels of a center region of the image of the current video frame are classified into blocks with a predetermined size template (e.g. 16×16 or 32×32). At step 203, for a specified block of the current video frame, in a reference frame corresponding to the current video frame, a block that is closest to the specified block (that is, a matching error between the block of the reference frame and the specified block of the current video frame is the smallest) and its position, is searched, thereby a motion vector with the smallest block matching error is determined. At step 204, the block matching errors between blocks adjacent to the block searched out in step 203 and the specified block of the current video frame is computed. Obviously, the block matching error of every block of the current video frame can be obtained by repeating the steps 203 and 204.

Figure 5:
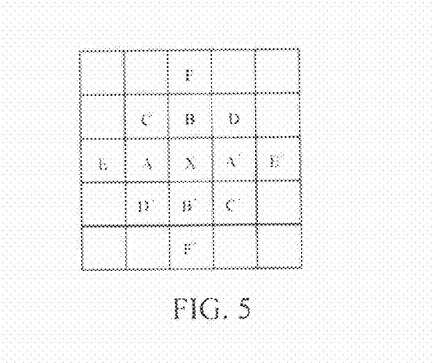
FIG. 5 is a schematic diagram of the motion vector corresponding to the block matching error used in step 302 in FIG. 3.

Following the steps as illustrated in FIG. 2, the video image is converted in resolution and partitioned into blocks (the size of the block can be 8×8, 16×16, or 32×32, etc.), and the motion vector of each block is searched in the reference frame; the searched result for the motion vectors is obtained, that is, for a specified block of the current video frame, the pixel position X where a center of the block is located when the matching error is the smallest is determined; then the block matching errors of the motion vectors corresponding to the individual adjacent positions centered by the searched result for the motion vectors (i.e., the pixel position X when the matching error is the smallest), as illustrated in FIG. 5, that is, the block matching errors between the individual adjacent blocks and the specified block is computed. FIG. 5 is a schematic diagram of the motion vector corresponding to the block matching error used in the step 302 in FIG. 3, wherein the individual motion vectors with respect of one specified image block can be represented as: having a common start point in the current frame, that is, the center position of the specified block, and the position of the block center in the reference frame representing the other end point of the individual motion vectors. As illustrated in FIG. 5, X corresponds to a motion vector with the smallest block matching error in the motion searching range; other marks correspond to motion vectors the pixel position of which are adjacent to that of X (one or two pixels away in the horizontal and vertical direction, and one pixel away in the diagonal direction).

The block matching error can be expressed by SSD (Sum of Square Difference) or SAD (Sum of Absolute Difference). For one image block (Block), its block matching error SSD and SAD are defined as follows, respectively, wherein I(x,y) represents a gray scale value of the image at the pixel position (x,y) (a subscript current represents the current frame image, and a subscript reference represents the reference frame image), H and V represent the horizontal and vertical directions respectively, and $MV_H$ and $MV_V$ represent the motion vectors of the image block in the H and V direction respectively. As described above, the motion vector can be represented as a pointing from the image block of the current frame to the image blocks of the reference frame. Therefore, the block matching error between the image block of the current frame and the image blocks of the reference frame can be represented by using SSD or SAD of the motion vector.

$$SSD(MV_H, MV_V) = \sum_{(x,y) \in Block} [I_{current}(x, y) - I_{reference}(x + MV_H, y + MV_V)]^2$$

$$SAD(MV_H, MV_V) = \sum_{(x,y) \in Block} |I_{current}(x, y) - I_{reference}(x + MV_H, y + MV_V)|$$

For the position symmetric to the searched result for the motion vectors (i.e., the position X corresponding to the smallest block matching error illustrated in FIG. 5), such as positions A and A', B and B', C and C', D and D', E and E' as well as F and F' as illustrated in FIG. 5, it is possible to save only the smaller block matching error and the motion vectors corresponding to the position thereof. In this way, for one image block, it only needs to save seven block matching errors including the smallest block matching error corresponding to the X. Of course, further more or less block matching errors can be saved.

Figure 3:
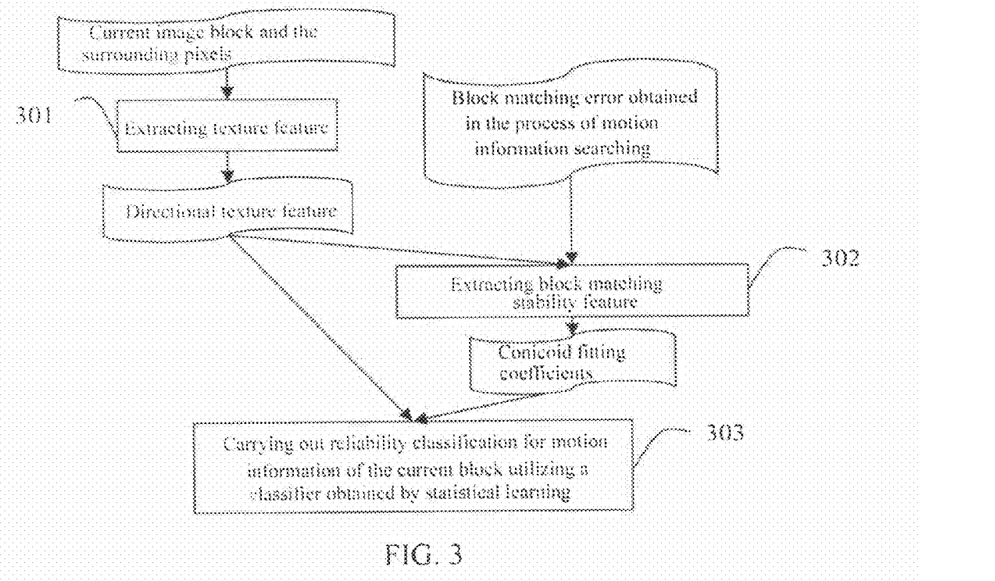
FIG. 3 is a detailed flowchart of step 102 and step 103 in FIG. 1.

FIG. 3 is a detailed flowchart of the step 102 and the step 103 in FIG. 1.

As illustrated in FIG. 3, at step 301, a directional texture feature is obtained by extracting texture features from the current image block and its surrounding pixels. The texture intensity $R(\theta)$ of the current image block (Block) in the individual directions $\theta$ is computed in accordance with following formula, by using an image differential operator (for example, A or B as shown in FIG. 4) (wherein the angel $\theta$ represents an angle of the texture and the horizontal direction (X) of the frame, it only needs to take some discrete values with a range from $-90°$ to $+90°$), the maximum value and the minimum value of the texture intensity as well as the direction $\theta_0$ corresponding to the minimum value of $R(\theta)$ are recorded, wherein $f_X(x,y)$ and $f_Y(x,y)$ represent local differences in the horizontal and vertical (Y) directions of the pixel position (x,y) (i.e., the pixel position of a center Z of an operator in the current image block Block in FIG. 4), respectively.

$$R(\theta) = \frac{\sin^2\theta \sum_{(x,y) \in Block} f_X^2(x,y) + \cos^2\theta \sum_{(x,y) \in Block} f_Y^2(x,y) - 2\sin\theta\cos\theta \sum_{(x,y) \in Block} f_X(x,y) f_Y(x,y)}{\left(\sum_{(x,y) \in Block} f_X^2(x,y)\right)\left(\sum_{(x,y) \in Block} f_Y^2(x,y)\right) - \left(\sum_{(x,y) \in Block} f_X(x,y) f_Y(x,y)\right)^2}$$

Figure 4:
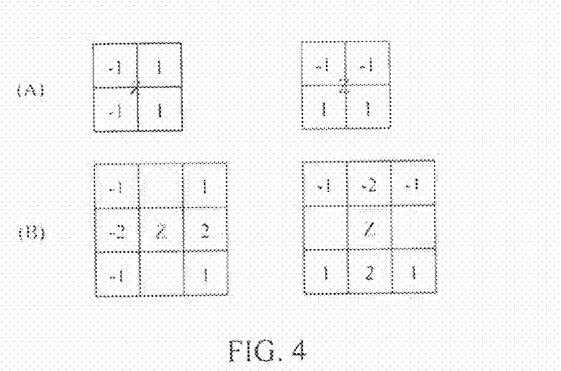

The two differential operators A and B as illustrated in FIG. 4 represent operator operations, that is, the gray scale values of an image in one specific region are summed with weight, a number in the operator representing the weight to be applied to corresponding pixel position (no number representing a weight of 0), Z representing the center position of the operator. The two operators in left and right are used to compute the differences in the horizontal and vertical directions respectively, and the two operators in (A) are used in a pair, and the two operators in (B) are used in a pair.

Figure 8A:
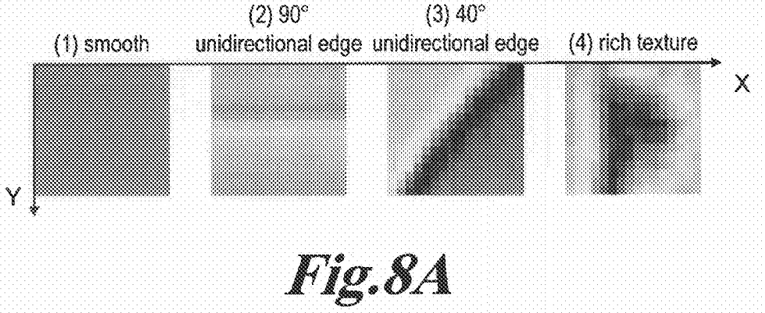
FIGS. 8A and 8B are examples of directional texture feature extractions of an image block.
Figure 8B:
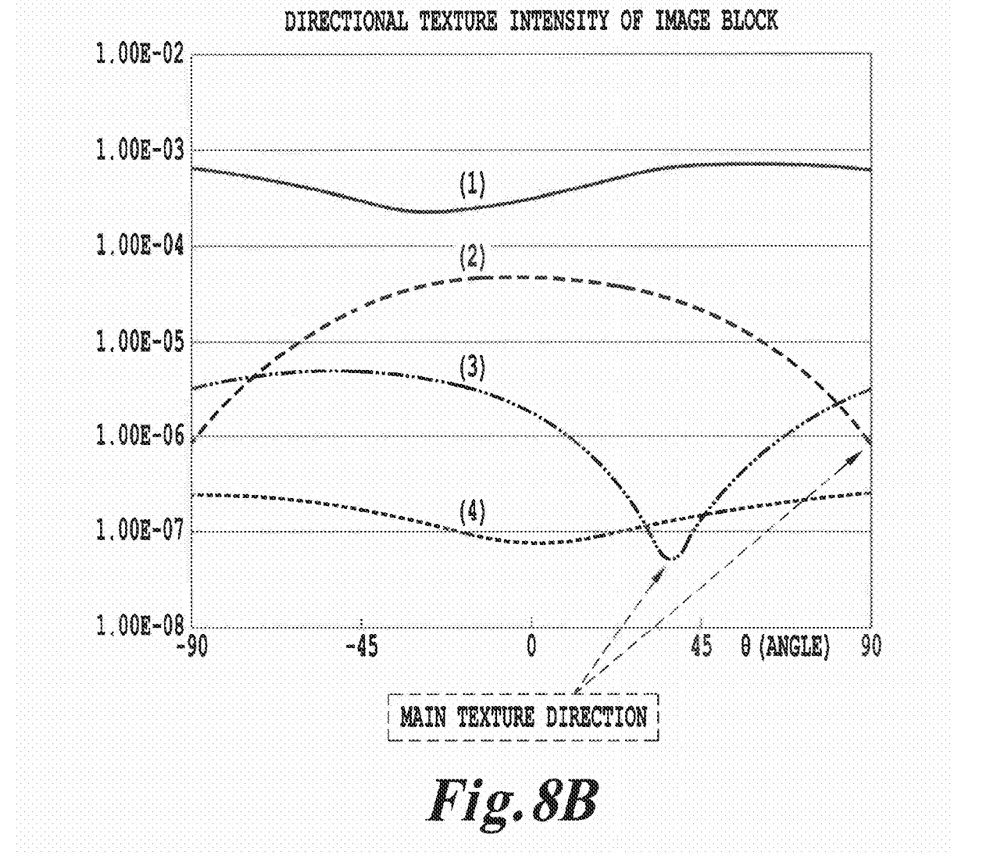

FIGS. 8A and 8B are examples of directional texture feature extractions of an image block, wherein FIG. 8A shows four examples of types of the image block in the order of a smooth image block, an image block having a unidirectional edge by 0° with the horizontal direction (X) of the frame, an image block having a unidirectional edge by 45° with the horizontal direction (X) of the frame, and an image block having rich texture; FIG. 8B shows the directional texture intensity function of the image block, the ordinate representing the texture intensity of the image block, and the abscissa representing the angle $\theta$ between the texture and the horizontal direction (X) of the frame, the minimum value of the texture intensity corresponds to main texture direction of the image block, that is, the above $\theta_0$. In FIG. 8B, four curves marked as (1), (2), (3) and (4) correspond to values of the texture intensity function (R) of the four image blocks in FIG. 8A at different angles ($\theta$).

At step 302, from the block matching error obtained in the process of motion information searching process (i.e. the steps 203 and 204 in FIG. 2), combining with the directional texture feature, the stability feature of the block matching is extracted, and conicoid fitting coefficients are obtained. At the process illustrated in the step 302, a conicoid fitting is carried out in accordance with the block matching error and the directional texture feature obtained previously, according to the following formula, where c equals to the block matching error corresponding to the searched result for motion vectors, $\theta$ equals to the direction corresponding to the smallest value $R(\theta)$ of the texture intensity, namely the main texture direction. Taking the block matching error of the above adjacent block (namely, the other block matching errors than the block matching error corresponding to the searched result for the motion vector, for example, as described above, 6 other block matching errors are saved) $SSD(MV_H, MV_V)$ and the corresponding motion vectors $MV_H$ and $MV_V$ in the horizontal H direction and the vertical V direction into the following formula, and the conicoid fitting coefficients a and b are estimated by using a least-square method. Magnitude relationships among a, b and c can represent the stability of block matching: the smaller the value of c is, the closer the current block is to the reference block; the bigger a and b are, the faster the increase of the block matching error is, as the motion vector deviates from the optimum point; small c as well as big a and b means the matching of the current block with the reference block is stable.

$$aX'^2 + bY'^2 + c = SSD(MV_H, MV_V)$$

$$\begin{cases} X' = X\cos\theta + Y\sin\theta \\ Y' = -X\sin\theta + Y\cos\theta \end{cases}$$

$$\begin{cases} X = MV_H - MV_H^{best} \\ Y = MV_V - MV_V^{best} \end{cases}$$

The second terms on the right of the above and below two equations of the above second system of equations represent the optimized block matching value found out by searching algorithm for motion vector in the H direction and V direction (the horizontal direction and the vertical direction) respectively, namely, the values of the motion vectors in the H direction and the V direction corresponding to the smallest block matching error.

At step 303, reliability classification for the motion information of the current block is carried out utilizing a classifier obtained by statistical learning, in accordance with the directional texture feature and the conicoid fitting coefficients. That is, taking the previously obtained a, b, c and the minimum value and the maximum value of the texture intensity as five features to evaluate the reliability for the motion information, the motion vectors are classified into three classes of reliable, mismatched and multi-matched, utilizing a classifier obtained by statistical learning. Here, sufficient video data is acquired, and manual mark of reliability classification for the motion vectors of the image block therein is carried out, so that the correct reliability classification for motion vectors is obtained, and the corresponding classification features are computed; then the correspondence between the reliability classification for motion vectors and the classification features is analyzed by statistics to obtain correspondence function, namely, the classifier obtained by statistical learning.

Figure 6:
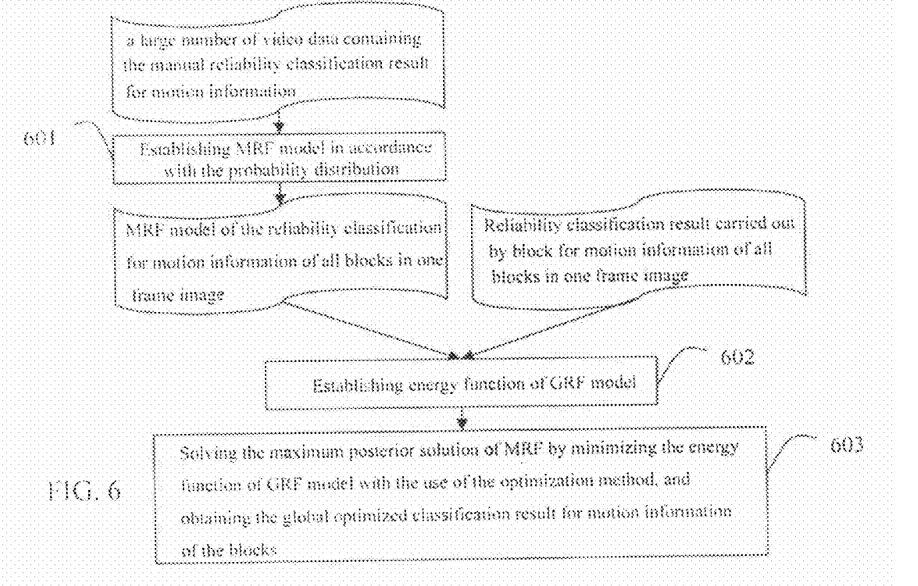
FIG. 6 is a detailed flowchart of step 104 in FIG. 1.

FIG. 6 is a detailed flowchart of the step 104 in FIG. 1.

As illustrated in FIG. 6, at step 601, a Markov Random Field (MRF) model based on a probability distribution is established from a large number of video data containing a result of a manual reliability classification for the motion information (the correct classification results by manual mark), to thereby obtain the MRF model of the reliability classification for motion information of all blocks in one frame image. That is, the Markov Random Field model is established in accordance with the data collection of the result of classification by block for motion information.

At step 602, an energy function of a Gibbs Random Field (GRF) model is established in accordance with the result of reliability classification by block for motion information of all blocks in one frame image obtained by following the flow as illustrated in FIG. 3, and the MRF model obtained from the step 601.

In this process, the data collection of the results obtained in the step 303 of FIG. 3 (the result of reliability classification by block for motion information of all blocks in one frame image) is taken as observation value g of the Markov Random Field, and f represents the probability realization of the Markov Random Field, that is, the values of the reliability classification results of all blocks in one frame image.

The flow of step 104 as illustrated in FIG. 6 is to obtain the optimized classification for motion vectors of blocks in one frame image, therefore, it is necessary to compute the maximum posterior probability realization of the Markov Random Field, namely, the optimized reliability classification result. In order to obtain the maximum posterior probability realization of the Markov Random Field, in accordance with the Bayesian Rule, maximizing posterior probability $P(f|g)$ is transformed into maximizing a product $P(f|g) \propto P(f) \cdot P(g|f)$ of prior probability $P(f)$ and conditional probability $P(g|f)$.

In accordance with Hamersley-Clifford theorem, the Markov Random Field is equivalent to the Gibbs Random Field. The prior probability of the Markov Random Field can be expressed by the Gibbs distribution.

$$P(f) = Z^{-1} \exp\left[-\sum_{c \in C} V_c(f_p, f_q)\right]$$

where $V_c(f_p, f_q)$ represents potential energy of adjacent blocks p and q, Z is a normalized constant, $f_p$ and $f_q$ represent the values of reliability classification results of the image blocks p and q, respectively, and C represents collection of all adjacent blocks. As shown in the deduction below, maximizing the prior probability can be transformed into minimizing sum of the two energy functions.

$$P(f)P(g|f) \propto \exp\left[-\sum_{c \in C} V_c(f_p, f_q)\right] \prod_{p \in P} P(g_p | f_p)$$

In the above formula, the conditional probability $P(g_p|f_p)$ is the probability that the classification result of the step 303 is $g_p$ when the real value (correct value) of the reliability classification result is $f_p$. Two sides of the above equations are converted into logarithm, and the logarithm values are maximized, right side is shown as follows, the maximization is transformed into the minimization of the sum of the two energy functions.

$$-\sum_{c \in C} V_c(f_p, f_q) + \ln\left(\prod_{p \in P} P(g_p | f_p)\right) =$$

$$-\left\{\frac{1}{2} \sum_{p \in P} \sum_{q \in N_p} V_c(f_p, f_q) - \sum_{p \in P} \ln(P(g_p | f_p))\right\} =$$

$$-\{E_{smoothness}(f) + E_{data}(f)\}$$

where $N_p$ represents collection of image blocks adjacent to the image block p, P represents collection of image blocks in the image, $E_{smoothness}$ (f) represents the energy introduced by the difference between the reliability classification relationship of the adjacent blocks in the optimized result and the statistical rules. For example, there are two adjacent image blocks of the same motion vectors, and if the statistical rules shows that the probability that their reliability classes are both reliable is high in the case that the adjacent blocks are of the same motion vectors, the energy corresponding to the case that they are both classified into the reliable class in the optimized result is small, and the energy corresponding to the other cases are relatively large; $E_{data}$ (f) represents the energy introduced by the difference between the optimized result (i.e, the output of the step 104) and the observation value (i.e., the output of the step 103), and it can be obtained by computing directly. The physical meaning implied herein is: the probability when the case occurs is lower, the corresponding energy is larger, and therefore, it is required that the energy is minimized.

$V_c(f_p, f_q)$ is defined as shown in the following expression in accordance with the Markovness between the adjacent blocks p and q:

$$V_c(f_p, f_q) = \begin{cases} u_{p,q} & \text{case } A: \quad f_p \neq f_q \text{ and } f_p \neq \text{mismatched and } f_q \neq \text{mismatched} \\ v_{p,q} & \text{case } B: \quad f_p = f_q = \text{reliable} \\ w_{p,q} & \text{case } C: \quad f_p = f_q = \text{multi-matched} \\ 0 & \text{case } D: \quad f_p = \text{mismatched or } f_q = \text{mismatched} \end{cases}$$

in the above expression, the values of $u_{p,q}$, $v_{p,q}$ and $w_{p,q}$ are related to the probabilities of the values of $f_p$ and $f_q$, and are $u_{p,q} = -\beta \ln(P_A)$, $v_{p,q} = -\beta \ln(P_B)$ and $w_{p,q} = -\beta \ln(P_C)$, respectively, where $\beta$ is a constant, the probability values $P_A$, $P_B$ and $P_C$ are the probabilities when case A, case B and case C occur, respectively, which are related to the motion information differences between the adjacent blocks, and the statistical frequency values are taken as the probability values. In order to further describe the motion information difference, it is divided into several limited segments in accordance with the magnitude of the motion vector difference between the adjacent blocks, $\|MV_p-MV_q\|$, then the values of $P_A$, $P_B$ and $P_C$ in the individual segments are analyzed by statistics. The reason for the probability analysis by segmentation other than in a unit of each different value is in that the samples with a larger motion vector difference are less, and the segmentation can ensure the number of samples in one segment is sufficient for the probability estimate.

Therefore, the energy function $E=E_{smoothness}(f)+E_{data}(f)$ of the Gibbs Random Field model can be derived by the above process.

At step 603, f, namely, the maximum posterior solution of MRF is solved by minimizing the above energy function of GRF model with the optimization method. That is to say, the optimized classification results globally (i.e. within the whole video frame) for motion vectors of the blocks can be obtained by utilizing the traditional optimization methods, such as, the confidence spread method and the diagram partition method, solved by minimizing the energy function, i.e. solving the maximum posterior probability realization of Markov model.

Figure 9:
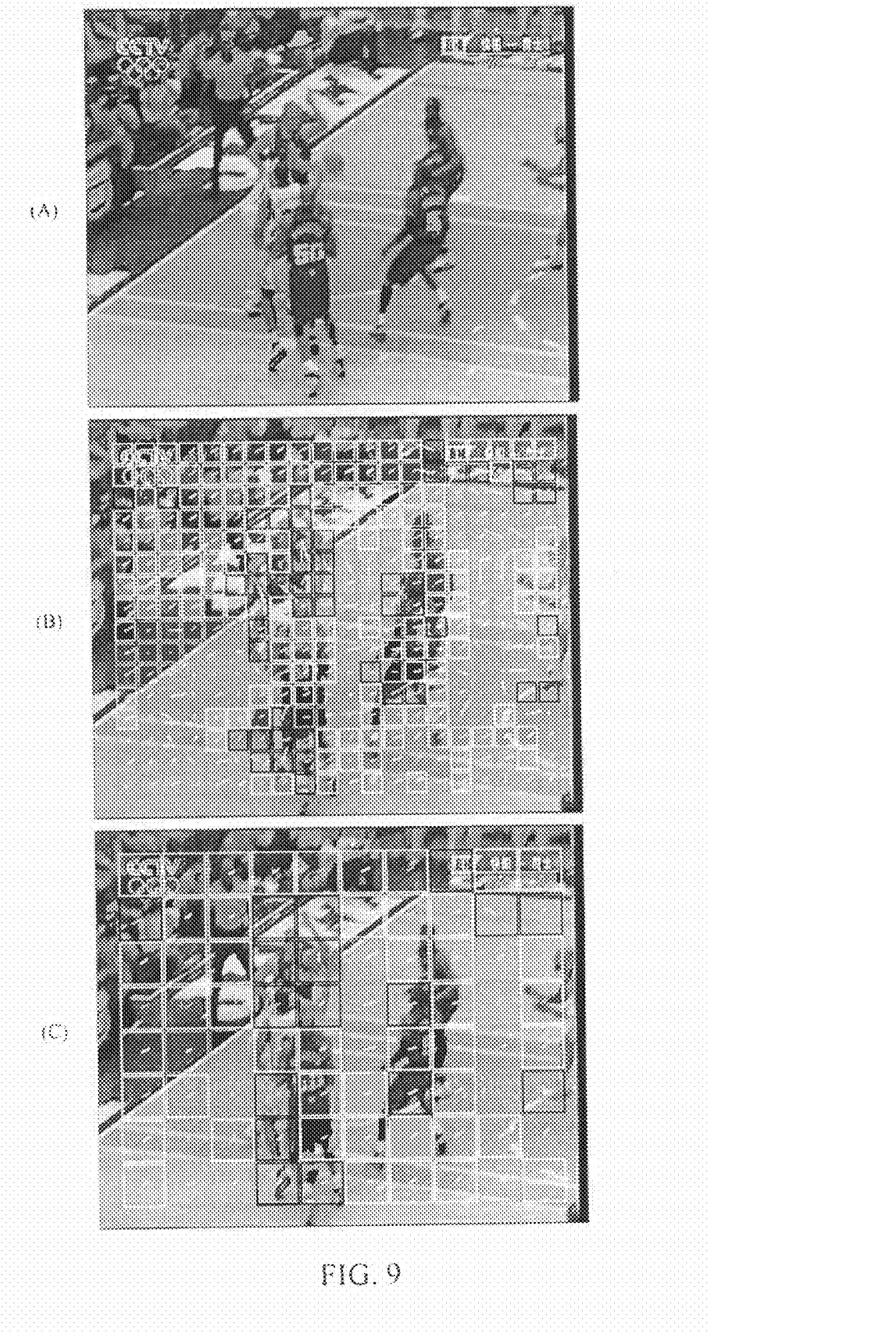
FIGS. 9(A) to (C) show an example of a result of the reliability classification carried out for the motion vectors by a method in accordance with one embodiment of the invention.

FIG. 9 is an example of a result of reliability classification carried out for the motion vectors by a method in accordance with one embodiment of the invention; wherein the motion vector corresponding to a black block is mismatched, the motion vector corresponding to a gray block is multi-matched, and the motion vector corresponding to a white block is reliable. In FIG. 9, (A) is a reference frame, (B) is a result of reliability classification for motion vectors after the current frame is partitioned into blocks by 16×16; and (C) is a result of reliability classification for motion vectors after the current frame is partitioned into blocks by 32×32.

It should be noted that, input to the flow of the step 104 shown in FIG. 6 (i.e. the input to the step 602) is not necessarily limited to output of the step 103, but can be the output of the other methods for MV reliability classification by block, for example, the reliability classification results (i.e. the reliable class and the unreliable class) of the blocks in the specified video frame obtained by the existing MV reliability classification methods can be used; for another example, the input to the flow of the step 104 can also be the case in which the results of the MV reliability classification by block are more than 3 classes. Through the flows shown in FIG. 6 (with the reliability classification results of the blocks obtained input to the step 602), the optimized classification result globally (i.e. within the whole video frame) for the motion vectors of the blocks can also be obtained. In the above examples, the other processes are the same as those described above, except that the probability value of $V_c(f_p, f_q)$ merely corresponds to that $f_p$ and $f_q$ are results obtained by the adopted MV reliability classification methods, (reliable and unreliable, or more than three kinds of corresponding classification results) which is not described herein to avoid redundancy.

Figure 10:
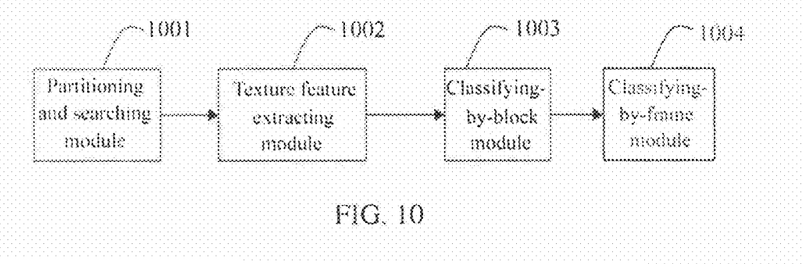
FIG. 10 is a block diagram of a system in accordance with one embodiment of the invention.

FIG. 10 is a block diagram of a system in accordance with one embodiment of the invention. The system comprises a partitioning and searching module 1001 for partitioning a specified video frame (i.e. the current video frame) of an input video, and searching motion vectors for a specified block of the specified video frame so as to generate a block matching error for the specified block; a texture feature extracting module 1002 for extracting a texture feature of the specified block (i.e. the current block); and a classifying-by-block module 1003 for carrying out MV reliability classification by block, that is, classifying the motion vectors into three classes of reliable, mismatched and multi-matched in accordance with the block matching error and the texture feature of the specified block; and a classifying-by-frame module 1004 for optimizing the MV classification by frame, that is, carrying out optimization to reliability classification for the motion vectors within the specified video frame in accordance with the reliability classification for the motion vectors of the blocks in the specified video frame, so as to obtain the optimized classification for the motion vectors of the blocks in the specified video frame.

Corresponding to the method shown in FIG. 1, the individual modules of the system in accordance with one embodiment of the invention shown in FIG. 10 can realize the functions corresponding to the steps shown in FIGS. 2, 3 and 6, and the detailed description will be omitted to avoid redundancy.

The method and system proposed by the present application not only classifies the motion vectors into two classes of reliable and unreliable, but also classifies the unreliable motion vectors into two types of mismatched and multi-matched, providing richer useful information. In the individual embodiments of the invention enumerated in the present application, the reliability classification is carried out by block by utilizing the current image block and the feature of the corresponding surrounding area in the reference frame; and the global optimization is carried out to the motion information reliability classification of the whole frame with the statistical model by utilizing the motion of the blocks adjacent to the current block and the motion reliability information. In the process of reliability classification by block, not only the block matching stability feature obtained in the motion vector searching process, but also the directional texture feature of the current image block itself is used. In the individual embodiments of the invention enumerated in the present application, the description of the whole scheme of the reliability classification for motion vectors and its detailed implementation, the method of extracting features necessary for the reliability classification and the global optimization method for the classification results is highlighted.

The method and system for carrying out reliability classification for motion vectors in a video proposed in the present application are applied to the processing and analysis on various videos with different formats and different contents, and its application is not limited to the image partition scheme and the motion searching method.

The invention can be applied to fields of the accurate extraction of the video motion information, the partition of the video object and the segmentation, retrieval and analysis to the video and so on. While a few examples in which the present invention is applied are described below, the application of the invention is not limited to the above and the following exemplified fields.

1. Global Motion Parameter Estimate of Video Camera

The global motion (operation) parameter estimate of a video camera is an important problem in the video analysis field. The estimate of these parameters generally depends on the motion vector information extracted from the video. It can be known from analysis that often only one half of the motion vectors obtained by the existing methods are reliable; and the unreliable motion vector information will affect the accuracy of the estimate result severely as the noise in the motion parameter estimate process. By the application of the present invention, it is possible to use only the reliable motion vectors and eliminate the influence of the unreliable information, thereby obtaining more accurate global motion parameter of the video camera.

2. Video Shot Transition Detection

Video shot transition detection is often the first step to process and analyze an edited video. The traditional methods based on histograms and texture features have not achieved a satisfactory detection result yet. The application of the present invention can largely improve the detection accuracy of shot transition. By the application of the present invention, the shot cut can be detected more accurately by utilizing the variation information of the proportions of the individual motion vector classes in each frame on the time axis. Feature of space distribution in the image and time distribution in the video of the individual motion vector classes, the global motion parameter of a video camera obtained by utilizing reliable motion vector estimate, and various motion (in space domain and time domain) statistical information using the weight of the motion vector reliability can help to improve the detection effect of the shot gradual change.

3. Detection and Partition of Motion Target Region

Motion target region in a video can be detected and partitioned in accordance with the difference between the local motion vector and the global motion model; but it must build on the basis that the motion information is reliable. The motion vectors in the region with the motion target varying rapidly are often unreliable; and by the application of the present invention, the motion vectors can be classified into the mismatched class, and such region generally corresponds to the motion target and its edge. Motion vectors in the smooth area are often unreliable; and by the application of the present invention, the motion vectors can be classified into the multi-matched class. The motion target region can be found more accurately with the elimination of these regions.

4. Video Frame Rate Increase (Including the Transition from Interlaced to Progressive)

The purposes of video frame rate increase is to estimate the missing frame data temporally from the obtained video frame, and the purpose of the transition from interlaced to progressive is to estimate the missing line data spatially from the obtained line in the image. Since the missing data are obtained from the motion estimation of (part of) the obtained data, the reliability of the motion information is very important. By the application of the present invention, for the region classified into mismatched, it can be partitioned into multiple smaller area units for searching motion vectors individually, thereby improving the accuracy of the motion vectors, recovering the missing data more accurately and increasing the output video quality.

5. Detection and Match of Wipe Between Video Shots

Video shot transition can be divided into two classes, Cut and Gradual; and Wipe belongs to one of Gradual. Wipe refers to that the image of the next shot gradually increases from a certain region in accordance with a certain rule, until the image of the previous shot is covered entirely. Wipe accompanying a process of a graphic mark picture in and out is referred to as Graphic Wipe. Due to the characteristics of Wipe, the motion vectors of the image block at the boundary of the previous and the next shot picture of each frame in the process often belong to the mismatched type (as shown in FIG. 11).

Figure 11:
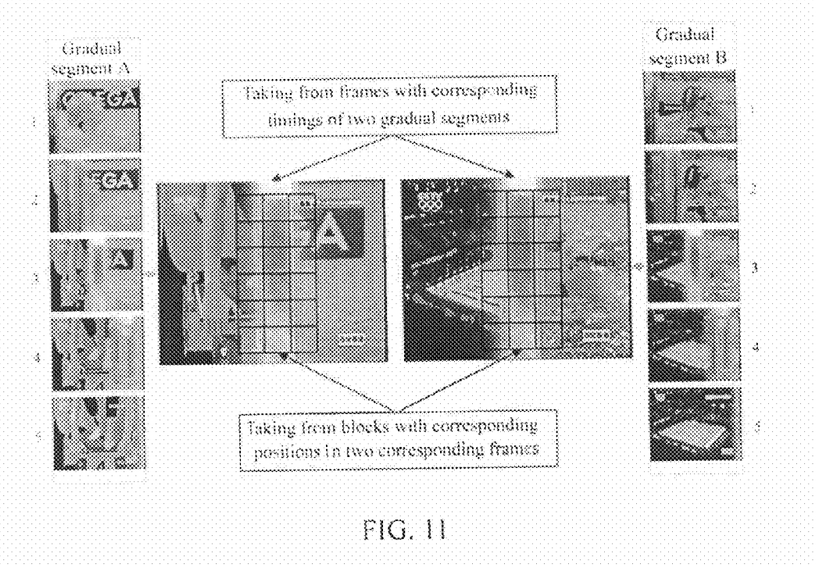
FIG. 11 illustrates an example of wipe between video shots.

FIG. 11 illustrates an example of a Wipe between video shots. The left and right columns of FIG. 11 are frames numbered as 1, 2, 3, 4, 5 in the order of time in gradual segment A and gradual segment B, respectively. Reliability classification for motion vectors in the frames with corresponding numerals in the two segments are carried out, wherein the position with a black box represents blocks the motion vector of which has a very high probability to be mismatched. If A and B both belong to the same Wipe type, the probability that the motion vectors of the blocks with corresponding positions in the corresponding frames are both mismatched is higher.

Therefore, the detection of Wipe can be carried out in accordance with distribution feature of the image blocks corresponding to the mismatch motion vectors in several frames during a certain time period. Furthermore, whether the two Graduals belong to the same Wipe type can be determined by utilizing the information on whether the motion vectors of the blocks with the individual corresponding positions in the corresponding frames at the individual timings within the two Gradual segments are mismatched, the information being very helpful to the Replay shot in the sports video detection.

The present application only describes the specific embodiments and realizations of the invention. Various improvements, modifications and other embodiments and realizations can be made in accordance with the content described in the present application.

For example, in addition to the method in accordance with one embodiment of the invention shown in FIG. 1 and the system in accordance with one embodiment of the invention shown in FIG. 10, in accordance with another embodiment of the method of the present invention, it is possible to comprise only the steps 101-103 shown in FIG. 1, and in accordance with another embodiment of the system of the present invention, it is possible to comprise only the partitioning and searching module 1001, the texture feature extracting module 1002 and the classifying-by-block module 1003 shown in FIG. 10.

In accordance with another embodiment of the method of the present invention, it is possible to comprise only the steps 103 and 104 shown in FIG. 1, or further comprise the step 101 or step 102; and in accordance with another embodiment of the system of the present invention, it is possible to comprise only the classifying-by-block module 1003 and the classifying-by-frame module 1004 shown in FIG. 10, or further comprise the partitioning and searching module 1001 or the texture feature extracting module 1002. The details are described as above and are omitted herein to avoid redundancy.

The invention claimed is:

1. A method for carrying out reliability classification for motion vectors in a video, comprising:
   partitioning a specified video frame of an input video, and searching motion vectors for a specified block of the specified video frame to generate a block matching error for the specified block;
   extracting a texture feature of the specified block, the texture feature including an edge feature; and
   carrying out reliability classification of the motion vectors of the specified block in accordance with the block matching error and the texture feature of the specified block,
   wherein said motion vectors are classified into three classes of reliable, mismatched and multi-matched, and the partitioning and searching comprises:
   generating a gray scale image with a lower resolution from the input video;
   partitioning a center region of the gray scale image of the specified video into multiple blocks with a predetermined size template;
   searching a block and a position thereof, the block matching error between which and the specified block is the smallest, in a reference frame corresponding to the specified video frame for the specified block, thereby determining a motion vector with the smallest block matching error; and computing the block matching errors between blocks adjacent to the position of the block corresponding to the smallest block matching error and the specified block.

2. The method of claim 1, further comprising:
optimizing the reliability classification of the motion vectors within the specified video frame in accordance with the reliability classification of the motion vectors of the blocks in the specified video frame, to obtain an optimized classification of the motion vectors of the blocks in the specified video frame.

3. The method of claim 2, wherein optimizing the reliability classification comprises:
establishing a Markov Random Field MRF model based on a probability distribution, from a number of video data containing a result of a manual reliability classification for the motion vectors;
establishing an energy function of a Gibbs Random Field GRF model by the equivalence of the Markov Random Field MRF to the Gibbs Random Field GRF with the reliability classification for the motion vectors of the blocks in the specified video frame being observation values of the Markov Random Field; and
solving by minimizing the energy function of the GRF model to obtain the optimized classification for the motion vectors of the blocks in the specified video frame.

4. The method of claim 3, wherein the energy function is a sum of two energies, one of which is:

$$\frac{1}{2} \sum_{p \in P} \sum_{q \in N_p} V_c(f_p, f_q)$$

where $V_c(f_p, f_q)$ indicates a potential energy of adjacent blocks p and q, $f_p$ and $f_q$ indicate values of reliability classification results of the blocks p and q, respectively, $N_p$ indicates a set of image blocks adjacent to the image block p, P indicates a set of image blocks in the image, $V_c(f_p, f_q)$ is defined as shown in the following expression in accordance with the Markovness between the adjacent blocks p and q:

$$V_c(f_p, f_q) = \begin{cases} u_{p,q} & \text{case } A: \quad f_p \neq f_q \text{ and } f_p \neq \text{mismatched and } f_q \neq \text{mismatched} \\ v_{p,q} & \text{case } B: \quad f_p = f_q = \text{reliable} \\ w_{p,q} & \text{case } C: \quad f_p = f_q = \text{multi-matched} \\ 0 & \text{case } D: \quad f_p = \text{mismatched or } f_q = \text{mismatched} \end{cases}$$

in the above expression, values of $u_{p,q}$, $v_{p,q}$ and $w_{p,q}$ are related to probabilities of the values of $f_p$ and $f_q$ and are $u_{p,q} = -\beta \ln(P_B)$ and $w_{p,q} = -\beta \ln(P_C)$, respectively, wherein $\beta$ is a constant, the probability values $P_A$, $P_B$ and $P_C$ are the probabilities occurring in case A, case B, and case C, respectively, which are related to motion vector differences between the adjacent blocks, and taking statistical frequency values as the probability values.

5. The method of claim 1, wherein:
the adjacent blocks and the block corresponding to the smallest block matching error are separated in position by one or two pixels horizontally and vertically, and one pixel diagonally, and for adjacent blocks symmetrical in position with respect to the block corresponding to the smallest block matching error, only the smaller block matching errors and the motion vectors corresponding to the positions of the adjacent blocks with the smaller block matching errors are retained.

6. The method of claim 5, wherein extracting the texture feature comprises comprising:
computing a texture intensity of the specified block in each direction from the specified block and the pixels around, thereby obtaining a maximum value and a minimum value of the texture intensities of the specified block and a main texture direction,
and the classifying-by-block step comprising:
carrying out a conicoid fitting in accordance with the following equation, wherein c indicates the smallest block matching error, $\theta$ indicates the main texture direction of the specified block, taking the block matching error of the adjacent block $SSD(MV_H, MV_V)$ and values $MV_H$ and $MV_V$ of the motion vector corresponding to the position thereof in a horizontal H direction and a vertical V direction into the following equation, and estimating the conicoid fitting coefficients a and b by using a least-square method, $$aX'^2 + bY'^2 + c = SSD(MV_H, MV_V)$$

$$\begin{cases} X' = X\cos\theta + Y\sin\theta \\ Y' = -X\sin\theta + Y\cos\theta \end{cases}$$

$$\begin{cases} X = MV_H - MV_H^{best} \\ Y = MV_V - MV_V^{best} \end{cases}$$

where second terms in right sides of the two equations both in the above and below of the second equations set indicates values of the motion vector corresponding to the smallest block matching error in the horizontal H direction and vertical V direction, respectively; and
classifying the motion vectors of the specified block into three classes of reliable, mismatched and multi-matched by using a classifier obtained by statistical learning, with a, b and c thus obtained and a minimum value and a maximum value of the texture intensities as 5 features to evaluate the reliability for the motion vectors.

7. The method of claim 1, wherein extracting the texture feature comprises:
computing a texture intensity of the specified block in each direction from the specified block and the pixels around, to obtain a maximum value and a minimum value of the texture intensities of the specified block and a main texture direction.

8. The method of claim 1, wherein carrying out reliability classification comprises:
carrying out a conicoid fitting in accordance with the block matching error and the texture feature of the specified block, thereby obtaining conicoid fitting coefficients; and
classifying the motion vectors of the specified block into three classes of reliable, mismatched and multi-matched by using a classifier obtained by statistical learning, with the texture feature and the conicoid fitting coefficients as features to evaluate the reliability for the motion vectors.

9. A system for carrying out reliability classification for motion vectors in a video, comprising:
a partitioning and searching module configured to partition a specified video frame of an input video, and configured to search motion vectors for a specified block of the specified video frame so as to generate a block matching error for the specified block;

a texture feature extracting module configured to extract a texture feature of the specified block, the texture feature including an edge feature; and a classifying-by-block module configured to carry out reliability classification of the motion vectors of the specified block in accordance with the block matching error and the texture feature of the specified block, wherein said motion vectors are classified into three classes of reliable, mismatched and multi-matched, and the partitioning and searching module comprising:

a means for generating a gray scale image with a lower resolution from the input video;

a means for partitioning a center region of the gray scale image of the specified video into multiple blocks with a predetermined size template;

a means for searching a block and a position thereof, the block matching error between which and the specified block is the smallest, in a reference frame corresponding to the specified video frame for the specified block, thereby determining a motion vector with the smallest block matching error; and a means for computing the block matching errors between blocks adjacent to the position of the block corresponding to the smallest block matching error and the specified block.

10. The system of claim 9, further comprising:

a classifying-by-frame module configured to optimize the reliability classification of the motion vectors within the specified video frame in accordance with the reliability classification of the motion vectors of the blocks in the specified video frame, to obtain an optimized classification of the motion vectors of the blocks in the specified video frame.

11. The system of claim 10, wherein the classifying-by-frame module comprising:

a means for establishing a Markov Random Field MRF model based on a probability distribution, from a number of video data containing a result of a manual reliability classification for the motion vectors;

a means for establishing an energy function of a Gibbs Random Field GRF model by the equivalence of the Markov Random Field MRF to the Gibbs Random Field GRF with the reliability classification for the motion vectors of the blocks in the specified video frame being observation values of the Markov Random Field; and a means for solving by minimizing the energy function of the GRF model to obtain the optimized classification for the motion vectors of the blocks in the specified video frame.

12. The system of claim 11, wherein the energy function is a sum of two energies, one of which is:

$$\frac{1}{2}\sum_{p\in P}\sum_{q\in N_p} V_c(f_p, f_q)$$

where $V_C(f_p, f_q)$ indicates a potential energy of adjacent blocks p and q, $f_p$ and $f_q$ indicate values of reliability classification results of the blocks p and q, respectively, $N_p$ indicates a set of image blocks adjacent to the image block p, P indicates a set of image blocks in the image, $V_c(f_p, f_q)$ is defined as shown in the following expression in accordance with the Markovness between the adjacent blocks p and q:

$$V_c(f_p, f_q) = \begin{cases} u_{p,q} & \text{case } A: & f_p \neq f_q \text{ and } f_p \neq \text{mismatched and} \\ & & f_q \neq \text{mismatched} \\ v_{p,q} & \text{case } B: & f_p = f_q = \text{reliable} \\ w_{p,q} & \text{case } C: & f_p = f_q = \text{multi-matched} \\ 0 & \text{case } D: & f_p = \text{mismatched or } f_q = \text{mismatched} \end{cases}$$

in the above expression, values of $u_{p,q}$, $v_{p,q}$ and $w_{p,q}$ are related to probabilities of the values of and $f_p$ and $f_q$ and are $u_{p,q} = -\beta \ln(P_A)$, $v_{p,q} = -\beta \ln(P_B)$ and $w_{p,q} = -\beta \ln(P_C)$, respectively, wherein β is a constant, the probability values $P_A$, $P_B$ and $P_C$ are the probabilities occurring in case A, case B, and case C, respectively, which are related to motion vector differences between the adjacent blocks, and taking statistical frequency values as the probability values.

13. The system of claim 9, wherein:

the adjacent blocks and the block corresponding to the smallest block matching error are separated in position by one or two pixels horizontally and vertically, and one pixel diagonally, and for adjacent blocks symmetrical in position with respect to the block corresponding to the smallest block matching error, only the smaller block matching errors and the motion vectors corresponding to the positions of the adjacent blocks with the smaller block matching errors are retained.

14. The system of claim 13, wherein the texture feature extracting module comprising:

a means for computing a texture intensity of the specified block in each direction from the specified block and the pixels around, thereby obtaining a maximum value and a minimum value of the texture intensities of the specified block and a main texture direction, and the classifying-by-block module comprising:

a means for carrying out a conicoid fitting in accordance with the following equation, wherein c indicates the smallest block matching error, θ indicates the main texture direction of the specified block, taking the block matching error of the adjacent block $SSD(MV_H, MV_V)$ and values $MV_H$ and $MV_V$ of the motion vector corresponding to the position thereof in a horizontal H direction and a vertical V direction into the following equation, and estimating the conicoid fitting coefficients a and b by using a least-square method, $$aX'^2 + bY'^2 + c = SSD(MV_H, MV_V)$$

$$\begin{cases} X' = X\cos\theta + Y\sin\theta \\ Y' = -X\sin\theta + Y\cos\theta \end{cases}$$

$$\begin{cases} X = MV_H - MV_H^{best} \\ Y = MV_V - MV_V^{best} \end{cases}$$

where second terms in right sides of the two equations both in the above and below of the second equations set indicates values of the motion vector corresponding to the smallest block matching error in the horizontal H direction and vertical V direction, respectively; and a means for classifying the motion vectors of the specified block into three classes of reliable, mismatched and multi-matched by using a classifier obtained by statistical learning, with a, b and c thus obtained and a minimum value and a maximum value of the texture intensities as 5 features to evaluate the reliability for the motion vectors.

15. The system of claim 9, wherein:

the texture feature extracting module computes a texture intensity of the specified block in each direction from the specified block and the pixels around, thereby obtaining a maximum value and a minimum value of the texture intensities of the specified block and a main texture direction.

16. The system of claim 9, wherein the classifying-by-block module comprising:

a means for carrying out a conicoid fitting in accordance with the block matching error and the texture feature of the specified block, thereby obtaining conicoid fitting coefficients; and a means for classifying the motion vectors of the specified block into three classes of reliable, mismatched and multi-matched by using a classifier obtained by statistical learning, with the texture feature and the conicoid fitting coefficients as features to evaluate the reliability for the motion vectors.

17. A non-transitory computer-readable medium encoded with computer-readable instructions thereon for carrying out reliability classification for motion vectors in a video, the computer readable instructions when executed by a computer cause the computer to perform a method comprising:

partitioning a specified video frame of an input video, and searching motion vectors for a specified block of the specified video frame so as to generate a block matching error for the specified block;

extracting a texture feature of the specified block, the texture feature including an edge feature; and carrying out reliability classification of the motion vectors of the specified block in accordance with the block matching error and the texture feature of the specified block, wherein said motion vectors are classified into three classes of reliable, mismatched and multi-matched, and the partitioning and searching comprises:

generating a gray scale image with a lower resolution from the input video;

partitioning a center region of the gray scale image of the specified video into multiple blocks with a predetermined size template;

searching a block and a position thereof, the block matching error between which and the specified block is the smallest, in a reference frame corresponding to the specified video frame for the specified block, thereby determining a motion vector with the smallest block matching error; and computing the block matching errors between blocks adjacent to the position of the block corresponding to the smallest block matching error and the specified block.

18. A method for carrying out reliability classification for motion vectors on a video, comprising:

partitioning a specified video frame of an input video, and searching motion vectors for a specified block of the specified video frame of the input video so as to generate a block matching error for the specified block;

extracting a texture feature of the specified block; and carrying out a conicoid fitting in accordance with the block matching error and the texture feature of the specified block to obtain conicoid fitting coefficients, the reliability classification for the motion vectors for the specified block being determined in accordance with the conicoid fitting coefficients and the texture of the specified block.

19. A system for carrying out reliability classification for motion vectors on a video, comprising:

a partitioning and searching module configured to partition a specified video frame of an input video, and configured to search motion vectors for a specified block of the specified video frame of the input video so as to generate a block matching error for the specified block;

a texture feature extracting module configured to extract a texture feature of the specified block; and a classify-by-block module configured to carry out a conicoid fitting in accordance with the block matching error and the texture feature of the specified block to obtain conicoid fitting coefficients, the reliability classification for the motion vectors for the specified block being determined in accordance with the conicoid fitting coefficients and the texture of the specified block.

* * * * *